United States Patent
Zhou et al.

(10) Patent No.: US 8,009,850 B2
(45) Date of Patent: Aug. 30, 2011

(54) PORTABLE ELECTRONIC APPARATUS

(75) Inventors: Cui-Yu Zhou, Shanghai (CN); Liang Zhang, Shanghai (CN); Ming Wen, Shanghai (CN)

(73) Assignee: Inventec Appliances Corp., New Taipei (TW)

( * ) Notice: Subject to any disclaimer, the term of this patent is extended or adjusted under 35 U.S.C. 154(b) by 492 days.

(21) Appl. No.: 12/265,448

(22) Filed: Nov. 5, 2008

(65) Prior Publication Data
US 2010/0061578 A1 Mar. 11, 2010

(30) Foreign Application Priority Data
Sep. 5, 2008 (TW) .............................. 97216132 A

(51) Int. Cl.
*H04R 1/02* (2006.01)
(52) U.S. Cl. ........................................ 381/345; 381/386
(58) Field of Classification Search .................. 381/345, 381/354, 386, 392, 395, 396
See application file for complete search history.

(56) References Cited

U.S. PATENT DOCUMENTS

| 6,038,327 A * | 3/2000 | Bleim et al. ................. 381/344 |
| 6,052,463 A * | 4/2000 | Godais et al. ............ 379/433.02 |
| 6,490,361 B1 * | 12/2002 | Klein ............................ 381/353 |
| 7,068,979 B2 * | 6/2006 | Pedersen et al. ............. 455/90.3 |
| 7,266,204 B2 * | 9/2007 | Watson et al. ................. 381/86 |
| 7,657,053 B2 * | 2/2010 | Kosuda ......................... 381/395 |

* cited by examiner

*Primary Examiner* — Ramon M Barrera
(74) *Attorney, Agent, or Firm* — J.C. Patents

(57) ABSTRACT

A portable electronic apparatus including a case, a speaker, a sound box cover, a first circuit board and a second circuit board is provided. The case has a sound hole and a plurality of limiting portions disposed around the sound hole. The speaker corresponding to the sound hole is disposed in the case. The sound box cover covers the speaker to define a back sound chamber among the sound box cover, the case and the speaker. The first circuit board is disposed in the case. The second circuit board with a first surface, a second surface and a plurality of pads is disposed on the sound box cover. The second circuit board is exposed on the sound box cover with the first surface. The second circuit board electrically connects to the first circuit board and the speaker through the pads respectively disposed on the first and the second surface.

8 Claims, 3 Drawing Sheets

PORTABLE ELECTRONIC APPARATUS

CROSS-REFERENCE TO RELATED APPLICATION

This application claims the priority benefit of Taiwan application serial no. 97216132, filed on Sep. 5, 2008. The entirety of the above-mentioned patent application is hereby incorporated by reference herein and made a part of this specification.

BACKGROUND OF THE INVENTION

1. Field of Invention

The present invention relates to an electronic apparatus and more particularly, to a portable electronic apparatus.

2. Description of Related Art

In the modern information era, people are becoming more and more dependent on portable electronic apparatus such as cellular phones, electronic dictionaries, personal digital assistants (PDAs), and handheld game consoles that are commonly seen in people's daily lives. Take cellular phones for example, various manufacturers devote research effort to minimizing weight and dimensions of cellular phones so as to provide users with portability. However, minimizing dimensions of cellular phones inevitably involves utilizing limited space to maximize sound quality.

A common cellular phone has a case and a speaker. The case has a sound hole. The speaker is disposed in the case and corresponds to the position of the sound hole. Between a front end of the speaker and the case, there forms a front sound chamber. A layer of foam is disposed between the front end of the speaker and the case to maintain a spatial distance therebetween. In addition, between a back end of the speaker and the case, there forms a back sound chamber. The speaker includes a magnet, a voice coil, and a vibration board. The operation theory of the speaker is that the magnet forms a magnetic loop and electric current passes through the voice coil disposed in the speaker, which generates a driving force in an up-down direction and causes the vibration board to vibrate. At this time, air vibrated by the vibration board generates sound. Sound waves generated by the vibration of the vibration board are transmitted between the front sound chamber and the back sound chamber without phase interference and thus sound quality is promoted.

However, the back sound chamber in the abovementioned design can not have an entirely closed space due to influence of chinks in the assembly of the case and an earphone plug hole on the case. Therefore, sound leakage may occur and sound quality is affected. Another design uses an injection molding technique to inject a case fully covering a speaker and forming an entirely closed back sound chamber between the case and the speaker. Although an entirely closed back sound chamber may promote sound quality, a case has to be injected to fully cover a speaker and manufacturing costs are thereby increased. Furthermore, a speaker and plastic are injection molded at the same time so the speaker can not be freely detached, which also increases maintenance burden.

SUMMARY OF THE INVENTION

The present invention provides a portable electronic apparatus which has an enclosed back sound chamber and maintenance convenience when disassembling.

The present invention provides a portable electronic apparatus including a case, a speaker, a sound box cover, a first circuit board, and a second circuit board. The case has a sound hole and a plurality of limiting portions. The limiting portions are disposed around the sound hole. The speaker is disposed in the case, between the limiting portions, and in correspondence with the sound hole. The sound box cover covers the speaker to define a back sound chamber among the sound box cover, the case, and the speaker. The first circuit board is disposed in the case. The second circuit board is disposed on the sound box cover and has a first surface, a second surface, and a plurality of pads. The second circuit board is exposed on the sound box cover through the first surface which is disposed back to back with the second surface. The pads are respectively disposed on the first surface and the second surface to allow the second circuit board to electrically connect to the first circuit board and the speaker through the pads on the first surface and the second surface.

In one embodiment of the present invention, the case further has at least a first wall and the sound box cover further has at least a second wall. The first wall and the second wall are adjacently juxtaposed to enclose the back sound chamber.

In one embodiment of the present invention, the portable electronic apparatus further includes at least a partition disposed between the speaker and the case to define a front sound chamber among the speaker, the case, and said at least a partition.

In one embodiment of the present invention, the case has a plurality of first locking portions. The limiting portions are respectively disposed between the first locking portions and the sound hole. The sound box cover further has a plurality of second locking portions respectively interlocking with the first locking portions.

In one embodiment of the present invention, the portable electronic apparatus further includes a plurality of first conductive components and a plurality of second conductive components. The first conductive components are disposed on the first circuit board and respectively contact the pads on the first surface. The second conductive components are all respectively connected between the pads on the second surface and the speaker.

In one embodiment of the present invention, the sound box cover further has an opening exposing the first surface of the second circuit board.

In one embodiment of the present invention, the sound box cover further has a plurality of third locking portions disposed around the opening and respectively interfering with the second circuit board in respect to structure.

In one embodiment of the present invention, the first conductive components include metal flat spring, and the second conductive components include conductive wires.

In the portable electronic apparatus of the present invention, an enclosed back sound chamber is formed due to a tight fit between a sound box cover and a case, which provides good sound quality. In addition, due a detachable design of the sound box cover, it is more convenient to disassemble at maintenance.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
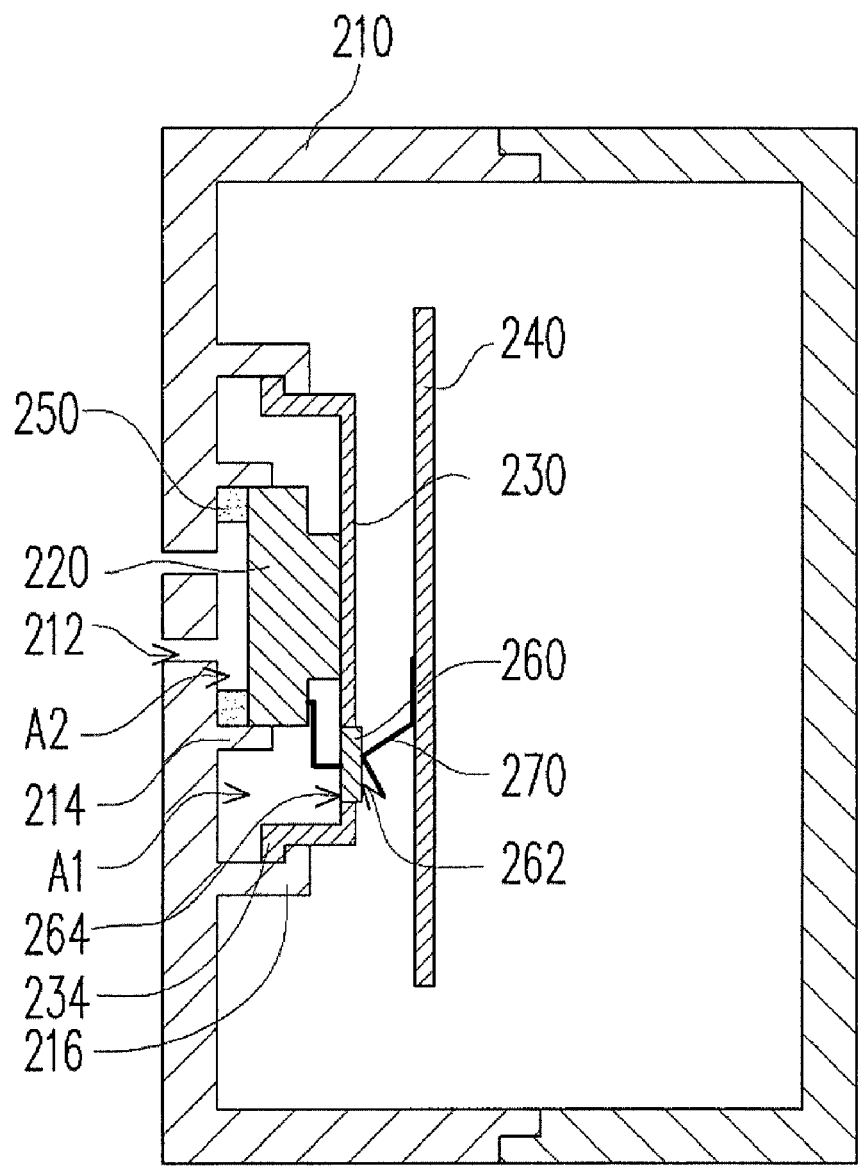
FIG. 1 is a cross-sectional schematic view of a portable electronic apparatus of one embodiment of the present invention.

FIG. 1 is a cross-sectional schematic diagram of a portable electronic apparatus of one embodiment of the present invention. Referring to FIG. 1, a portable electronic apparatus 200 (e.g. a cellular phone) includes a case 210, a speaker 220, a sound box cover 230, and a first circuit board 240. The case 210 has a sound hole 212 and a plurality of limiting portions 214 (two are shown for illustration). A shape of the sound hole 212 is circular or conical, for example. There may also be a plurality of sound holes that are juxtaposed or disposed as concentric circles. The limiting portions 214 and the case 210 are injection molded, for example. The limiting portions 214 are disposed around the sound hole 212 and used to dispose the speaker 220 and limit the speaker 220 from movement. The speaker 220 is disposed in the case 210, between the limiting portions 214, and in correspondence with the sound hole 212.

In other words, the speaker 220 outputs sound through the sound hole 212 on the case 210 to the outside. The sound box cover 230 covers the speaker 220 to form an enclosed space. The space among the sound box cover 230, the case 210, and the speaker 220 is a back sound chamber A1. The back sound chamber A1 may be designed based on characteristics of the speaker 220 so as to achieve optimal sound quality. The first circuit board 240 is disposed in the case 210 and electrically connected to the speaker 220. The sound from the speaker 220 is transmitted in the enclosed back sound chamber A1 so sound leakage through chinks in the case 210 (not shown) or earphone plug hole (not shown) is prevented. Therefore, superior sound quality can be obtained. Furthermore, the sound box cover 230 is an individual component which allows for convenient disassembly and thus lowered maintenance costs.

The portable electronic apparatus 200 may further include at least a partition 250. The partition 250 disposed between the speaker 220 and the case 210 is fixed onto the case 210 with an adhesive, for example. The space among the speaker 220, the case 210, and the partition 250 is a front sound chamber A2. A material of the partition 250 is, for example, foam or rubber with shock absorption capability.

Figure 2:
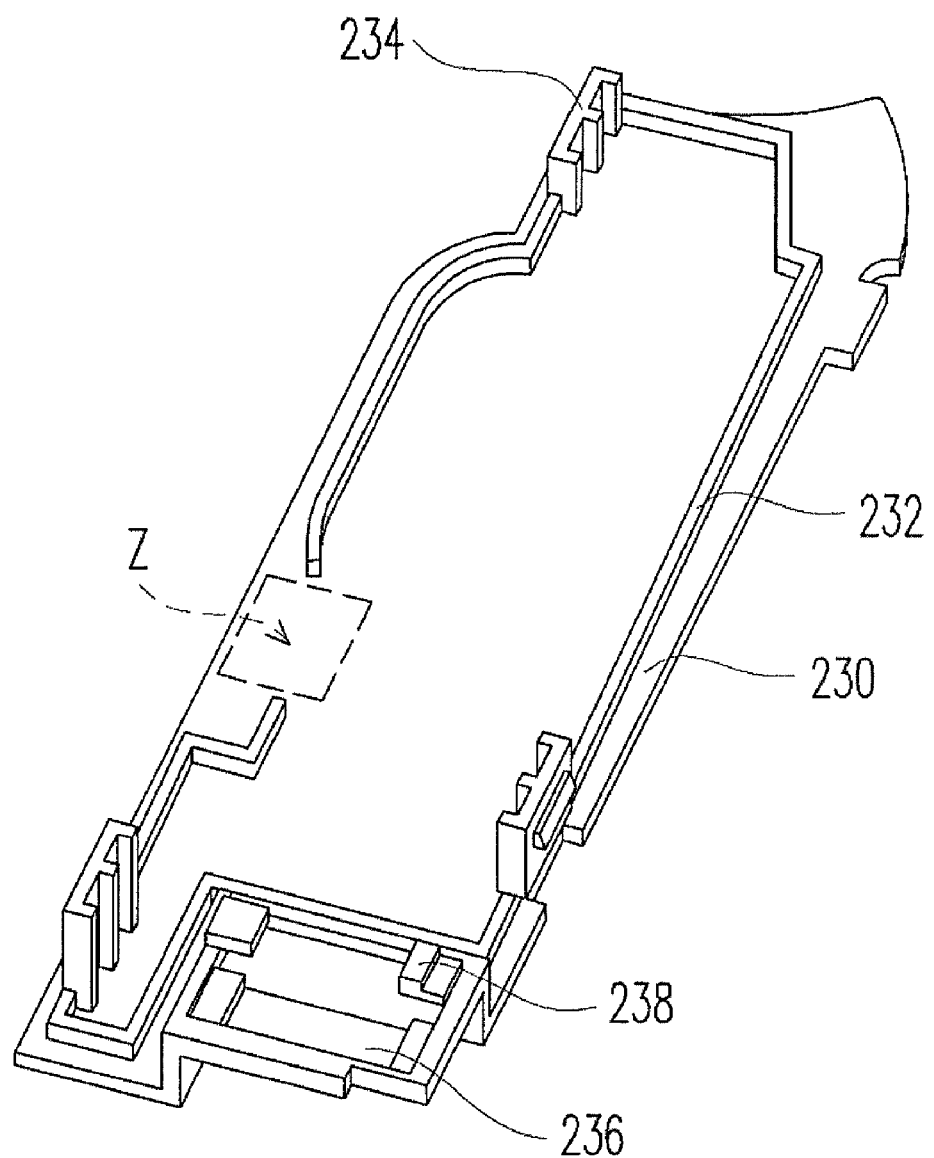
FIG. 2 is a perspective schematic view of a sound box cover of FIG. 1.

FIG. 2 is a perspective schematic view of a sound box cover of FIG. 1. Referring to both FIG. 1 and FIG. 2, the case 210 has at least a first wall (not shown) and a plurality of first locking portions 216. The abovementioned limiting portions 214 are respectively disposed between the first locking portions 216 and the sound hole 212. The sound box cover 230 may further have at least a second wall 232 and a plurality of second locking portions 234. Referring to FIG. 2, a zone Z illustrates a position of the first wall (not shown) when the sound box cover 230 covers on top of the case 210 so that the first wall and the second wall 232 are adjacently juxtaposed. In preferred embodiments, the first wall and the second wall 232 are adjacently juxtaposed to enclose the back sound chamber A1. The first locking portions 216 and the second locking portions 234 are fixed in an interlocking manner so that the speaker 220 may be stably disposed between the sound box cover 230 and the case 210. The interlocking relationship between the first locking portions 216 and the second locking portions 234 of the sound box cover 230 effectively limits shift in the position of the sound box cover 230. As such, the sound box cover 230 can be secured on the case 210, resulting in the enclosed back sound chamber A1 and increased sound quality.

In light of the above, in the present embodiment, the first locking portions 216 and the second locking portions 234 achieve a securing effect in an interlocking manner. However, in other embodiments, the securing method is not limited and the principle lies with achieving a tight fit. For example, screws may be used for securing.

Figure 3:
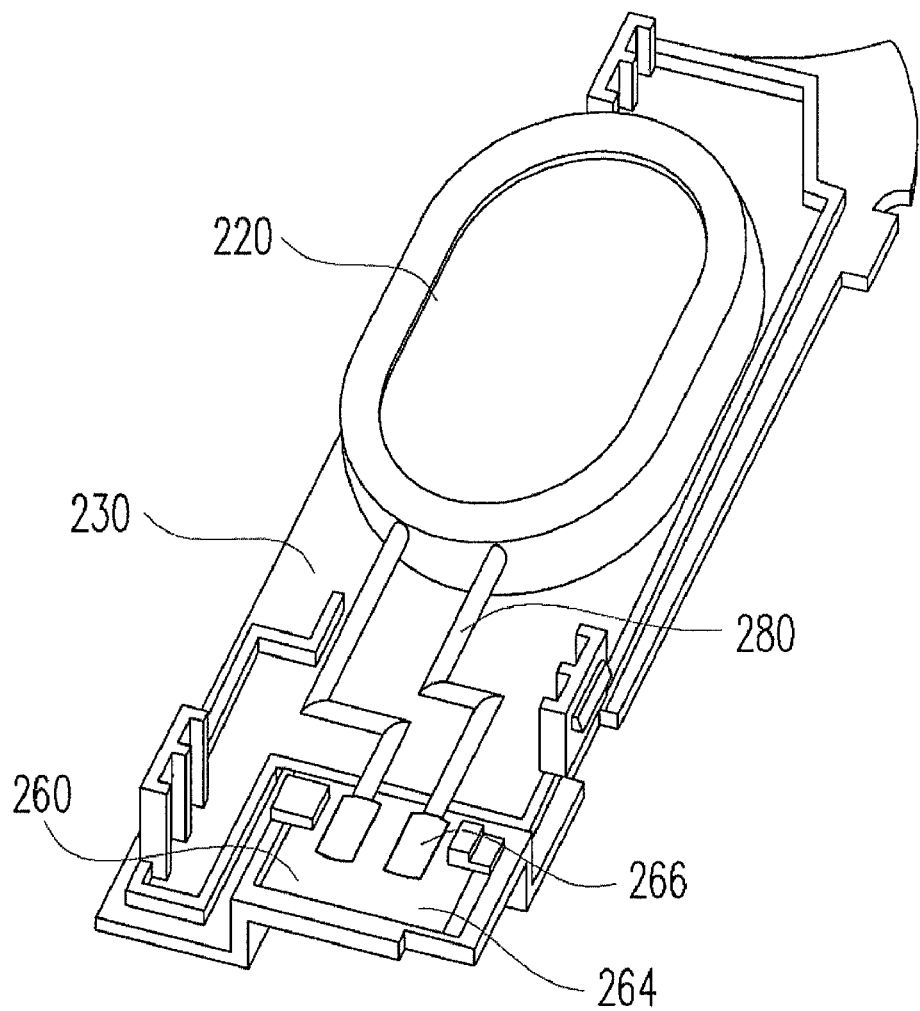
FIG. 3 is a perspective schematic view of a sound box cover fixed with a speaker of FIG. 1.

FIG. 3 is a perspective schematic view of a sound box cover fixed with a speaker of FIG. 1. Referring to both FIG. 1 and FIG. 3, A portable electronic apparatus 200 may further include a second circuit board 260, a plurality of first conductive components 270 (one of the plurality is shown for illustration), and a plurality of second conductive components (two are shown for illustration). In the present embodiment, the second conductive components 280 are conductive wires or other components, for example.

The second circuit board 260 is disposed on a sound box cover 230 and has a first surface 262, a second surface 264, and a plurality of pads 266. The pads 266 are disposed on the second surface 264. In the present embodiment, the second circuit board 260 further has a plurality of pads (not shown) disposed on the first surface 262. The first surface 262 and the second surface 264 are disposed back to back with each other. The second circuit board 260 is exposed on the sound box cover 230 through the first surface 262. The first conductive components 270 are metal flat spring, for example, and are disposed on the first circuit board 240. The first conductive components 270 contact the pads on the first surface 262 through the elasticity of the metal flat spring. Welding is not required for securing so convenience of assembly is increased. Signal transmission through the pads on the first surface 262 and the pads 266 on the second surface 264 may effectively enable the second conductive components 280 to electrically connect respectively to the first conductive components 270. Ends of the second conductive components 280 are connected to the pads 266 on the second surface 264 and the other ends are connected to the speaker 220. Signals may be mutually transmitted through the electrical connection of the second conductive components 280. In other words, the second conductive components 280 are respectively connected between the pads 266 on the second surface 264 and the speaker 220.

From the above description, the first circuit board 240 transmits signals to the second circuit board 260 through the first conductive components 270. The second circuit board 260 then transmits the signals to the speaker 220 through the second conductive components 280 to accomplish signal transmission.

As shown in FIG. 2, the sound box cover 230 may further have an opening 236 and a plurality of third locking portions 238. The third locking portions 238 are disposed around the opening 236 and respectively interfere with the second circuit board 260 in respect to structure. Therefore, the second circuit board 260 may be stably secured on the sound box cover 230. In addition, the opening 236 may allow the first surface 262 of the second circuit board 260 to be exposed and enable the pads on the first surface 262 to connect with the first conductive components 270.

In summary, the portable electronic apparatus of the present invention has superior sound quality because the sound box cover tightly fits with the case to thereby form an enclosed back sound chamber and sound transmission is not affected by sound leakage, resulting in optimal sound quality.

Furthermore, the sound box cover may be freely detached. Therefore, manufacturing costs are lowered and maintenance convenience is increased.

Although the present invention has been described with reference to particular embodiments thereof, it will be apparent to one of ordinary skill in the art that modifications to the described embodiments may be made without departing from the spirit of the present invention. Accordingly, the scope of the invention will be defined by the attached claims and not by the above detailed description.

What is claimed is:

1. A portable electronic device, comprising:
    a case, having a sound hole and a plurality of limiting portions, wherein the limiting portions are disposed around the sound hole;
    a speaker, disposed in the case, between the limiting portions, and in correspondence with the sound hole;
    a sound box cover, covering the speaker to define a back sound chamber among the sound box cover, the case, and the speaker;
    a first circuit board, disposed in the case; and
    a second circuit board, disposed on the sound box cover and having a first surface, a second surface and a plurality of pads, wherein the first surface and the second surface are back to back with each other, the second circuit board is exposed on the sound box cover through the first surface, and the pads are respectively disposed on the first surface and the second surface to allow the second circuit board to electrically connect to the first circuit board through the pads on the first surface and to electrically connect to the speaker through the pads on the second surface.

2. The portable electronic apparatus according to claim 1, wherein the case further has at least a first wall, the sound box cover further has at least a second wall, and the first wall and the second wall are adjacently juxtaposed to enclose the back sound chamber.

3. The portable electronic apparatus according to claim 1, further comprising:
    at least a partition, disposed between the speaker and the case to define a front sound chamber among the speaker, the case, and said at least a partition.

4. The portable electronic apparatus according to claim 1, wherein the case has a plurality of first locking portions, the limiting portions are respectively disposed between the first locking portions and the sound hole, and the sound box cover further has a plurality of second locking portions respectively interlocking with the first locking portions.

5. The portable electronic apparatus according to claim 1, further comprising:
    a plurality of first conductive components, disposed on the first circuit board and respectively contacting the pads on the first surface; and
    a plurality of second conductive components, all connected between the pads on the second surface and the speaker.

6. The portable electronic apparatus according to claim 5, wherein the sound box cover further has an opening exposing the first surface of the second circuit board.

7. The portable electronic apparatus according to claim 6, wherein the sound box cover further has a plurality of third locking portions disposed around the opening and respectively interfering with the second circuit board in respect to structure.

8. The portable electronic apparatus according to claim 5, wherein the first conductive components comprise metal flat spring and the second conductive components comprise conductive wires.

* * * * *